United States Patent
Kawamura et al.

(10) Patent No.: US 6,855,196 B2
(45) Date of Patent: Feb. 15, 2005

(54) INK FOR A DISPLAY PANEL AND METHOD FOR PRODUCING PLASMA DISPLAY PANEL USING THE INK

(75) Inventors: Hiroyuki Kawamura, Katano (JP); Keisuke Sumida, Hirakata (JP); Shigeo Suzuki, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 112 days.

(21) Appl. No.: 10/257,556

(22) PCT Filed: Apr. 16, 2001

(86) PCT No.: PCT/JP01/03227

§ 371 (c)(1),
(2), (4) Date: Oct. 11, 2002

(87) PCT Pub. No.: WO01/79362

PCT Pub. Date: Oct. 25, 2001

(65) Prior Publication Data

US 2003/0096056 A1 May 22, 2003

(51) Int. Cl.[7] ............................................. C09D 11/00
(52) U.S. Cl. .............. 106/31.6; 106/31.64; 252/301.36; 252/301.4; 252/301.5; 252/301.6; 252/519.3; 252/519.32; 252/519.33; 252/520.3; 313/582; 427/64; 427/66
(58) Field of Search .......................... 106/31.6, 31.64, 106/400; 313/582; 427/64, 66; 252/301.36, 301.4–301.6, 519.3, 519.32, 519.33, 520.3; 501/17, 20

(56) References Cited

U.S. PATENT DOCUMENTS 5,772,916 A * 6/1998 Jamil et al. ............ 252/301.4 R
6,100,633 A * 8/2000 Okumura et al. ............ 313/486

FOREIGN PATENT DOCUMENTS

| EP | 0 834 899 | 4/1998 |
| EP | 0 834 899 | * 8/1998 |
| JP | 09-237570 | 9/1997 |
| JP | 09-265833 | 10/1997 |
| JP | 11-040054 | 2/1999 |
| JP | 11-185636 | 7/1999 |
| JP | 11-273557 | 10/1999 |
| JP | 11-314936 | 11/1999 |

* cited by examiner

*Primary Examiner*—C. Melissa Koslow
*Assistant Examiner*—Shalie A. Manlove

(57) ABSTRACT

An ink for a display panel effective in reducing the uneven adhesion of the ink is applied by an ink application apparatus using an inkjet method to form a structural layer (e.g. reflective layer, phosphor layer) of a display panel such as a plasma display panel. The ink is delivered through a nozzle of the ink application apparatus and includes a powder material used in forming the structural layer, water or a water-miscible solvent, a binder formed from a water-soluble resin, and a plasticizer. The flexibility retained by the ink, even after the ink is applied, allows for leveling of the applied ink to occur and uneven adhesion to be reduced as a result.

28 Claims, 7 Drawing Sheets

INK FOR A DISPLAY PANEL AND METHOD FOR PRODUCING PLASMA DISPLAY PANEL USING THE INK

TECHNICAL FIELD

The present invention relates generally to display panels such as plasma display panels and liquid crystal display panels, and more particularly to reducing the uneven adhesion of an ink for display panels applied in forming structural layers of the display panels.

BACKGROUND ART

In recent years, thin lightweight display devices such as liquid crystal displays (LCD) and plasma display panels (PDP) have attracted much attention for their applicability in computer and television image display. In particular, the responsiveness, wide viewing angle, and suitability for large-screen application of PDPs have resulted in widespread moves in industry and research to secure a market for PDPs.

A PDP is formed from a front glass substrate having a plurality of display electrodes and a back glass substrate having a plurality of address electrodes. The front and back glass substrates are arranged parallel to and facing one another, and a plurality of barrier ribs are provided in a stripe-pattern therebetween. Phosphor layers in the order red (R), green (G), and blue (B) are formed in the gap ("rib gap") between adjacent barrier ribs, and the gaps are filled with a discharge gas.

Image display in the PDP is achieved when ultraviolet light, which is emitted as a result of a discharge generated when a drive circuit is used to apply a voltage to the electrodes, strikes the phosphor particles of the phosphor layers and excites them to emit visible light.

The phosphor layers are commonly formed using a screen-printing method, in which the rib gap between adjacent ribs is filled with a phosphor ink, and the ink is then baked. However, this screen-printing method is not readily applicable in the manufacture of PDPs in which the width of the rib gap has been reduced in response to demands in recent years for higher definition image display. In a full specification (1920×1125 pixels) 42-inch high definition (HD) PDP, for example, the rib pitch is a fine 0.1 mm to 0.15 mm, and when a thickness of the barrier ribs is taken into account, a narrow rib gap of 0.08 mm to 0.1 mm remains within which to apply the ink. Since the phosphor ink conventionally used in screen-printing has a high viscosity running into tens of thousands of centipoises, accurately applying the phosphor ink in a narrow rib gap at a high speed is not easily achieved.

Alternative methods for forming the phosphor layers include a photoresist film method, a photoresist ink method, and an inkjet method.

According to the photoresist film and ink methods, either a film is embedded or an ink is applied in the rib gap between adjacent barrier ribs. The film and the ink are both formed from a photosensitive ultraviolet resin that includes RGB phosphors. After the film is embedded or the film is applied, the areas of film or ink that will form the phosphor layers are exposed and developed, while the unexposed film or ink is washed away. According to both these methods, the phosphor layers can be formed in the rib gaps with a reasonable degree of accuracy, even when the barrier ribs are finely pitched.

However, in addition to manufacturing complications resulting from the embedding/applying, exposing, developing, and washing having to be conducted sequentially for each of the three colors RGB, there is the problem of the colors easily becoming mixed. Moreover, because of the relatively high cost of the phosphors and the difficulties involved in collecting phosphors washed away during the washing process, the photoresist film and ink methods are expensive to implement.

In comparison, according to an inkjet method as disclosed in unexamined patent application publications 53-79371 and 8-162019 filed in Japan, an ink formed from a phosphor material and an organic binder is discharged under pressure though a plurality of nozzles of an ink application apparatus while scanning up and down to apply the ink in the desired pattern.

This inkjet method allows for the phosphor ink to be applied accurately within a desired rib gap, and therefore provides a simple and cost effective means of forming the phosphor layers that dispenses with the exposure and washing processes required in the photoresist methods.

The phosphor ink conventionally used in the inkjet method is a mixture of an organic binder (ethyl cellulose, acrylic resin, or polyvinyl alcohol, etc.), a solvent (terpineol, butyl carbitol acetate, etc.), and phosphor particles.

However, the comparatively high dielectric constant of the organic binder and the solvent results in the ink becoming charged from the shearing stress that occurs when the ink passes through the tubing and nozzle parts of the ink application apparatus. As a result, the ink flows discharged from the plurality of nozzles react with each other, causing dispersion in the delivery of the ink. Consequently, the phosphor ink is applied and adheres in an uneven manner. In order to improve brightness in a PDP it is important that the phosphor layers be applied evenly to the walls and base of the gap between adjacent barrier ribs, although this is difficult to achieve with the conventional inkjet method described above.

Apart from phosphor ink, the inkjet method can also be employed to apply inks that include particles used in forming structural layers of the PDP other than the phosphor layers. Examples of such particles include silver particles used in forming silver electrodes and dielectric glass particles used in forming dielectric layers. However, since these alternative inks also include the solvents and organic binders described above, there remains the problem of the uneven adhesion of the ink resulting from dispersion in the ink delivery as well as reductions in the solvent concentrations in the ink.

DISCLOSURE OF THE INVENTION

In view of the issues discussed above, an object of the present invention is to provide an ink for a display panel that reduces the uneven adhesion of the ink, even when there is a reduction in the concentrations of solvent in the ink.

An ink provided to achieve the above object is applied to a display panel substrate using an inkjet method and includes a powder material used in forming a structural layer of the display panel, water or a water-miscible solvent, a binder formed from a water-soluble resin, and a plasticizer.

The ink thus provided is effective in reducing the uneven adhesion of the ink by preventing the charging and consequent uneven flow of the ink discharged from a nozzle of an ink application apparatus using the inkjet method. The charging of the ink is prevented by the conductivity of the ink, which results from the water absorbing qualities of the solvent allowing the ink to absorb moisture from the air. However, because of the force of the inkjet discharge, there remains the problem of the phosphor ink applied in the rib gaps forming a film that is thicker on the sides of each rib gap than on the base. When the ink is applied, the solvent included in the ink disperses into the porous rib walls, and the concentrations of solvent in the ink are reduced as a result. The viscosity of the ink thus increases, causing the ink to harden on the rib walls before much of the ink has a chance to flow down to the base of the gap. As such, phosphor layers are formed in the rib gaps that are thicker on the rib walls than on the base. In a PDP, this causes a reduction in the cell aperture ratio, and a subsequent reduction in brightness. However, the plasticizer included in the ink of the present invention serves to counter this tendency. Including the plasticizer allows for leveling of the ink to occur for an extended period of time. This is because of the considerable amounts of plasticizer remaining in the resin component after the ink is applied, even when the solvent concentrations have been reduced through dispersion and evaporation. Uneven adhesion of the applied ink can thus be suppressed.

The ink will be of a suitable viscosity for use in the inkjet method if the binder is included in a range of 1 wt % to 20 wt % inclusive of the ink at the time of application.

The ink will remain at a viscosity that facilitates the leveling process after the ink is applied if the plasticizer is included in a range of 0.5 wt % to 10 wt % inclusive of the ink at the time of application.

The water-soluble resin may include at least one member selected from the group consisting of hydroxypropyl cellulose, ethylhydroxyethyl cellulose, carboxymethyl cellulose, polyvinyl alcohol, and polyvinyl ether, and the weight-average molecular weight of the resin preferably should be in a range of 30,000 to 100,000 inclusive.

The viscosity of a water-soluble resin in solution form is generally dependant on its weight-average molecular weight, and the range given above allows for an optimal viscosity of the ink to be achieved at the time of application. Furthermore, a water-soluble resin including at least one of the above resins is suitable as the binder because almost no residue remains after the baking process, even at conventional baking temperatures.

The water-miscible solvent may include at least one member selected from the group consisting of ethylene glycol, ethylene glycol monoacetate, ethylene glycol monoethyl ether, ethylene glycol monobutyl ether, ethylene glycol monomethyl ether, ethylene glycol monomethyl ether acetate, 3-methoxy-3-methylbutanol, allylalcohol, isopropyl alcohol, ethanol, glycidol, tetrahydrofurfuryl alcohol, t-buthanol, furfuryl alcohol, propargyl alcohol, 1-propanol, methanol, 3-methyl-1-butyne-3-ol, 15-crown-5, 18-crown-6, propylene oxide, 1,4-dioxane, dipropyl ether, dimethyl ether, tetrahydrofuran, acetaldehyde, diacetone alcohol, methyl lactate, γ-butyl lactone, glycerin, glycerin-1,2-dimethyl ether, glycerin-1,3-dimethyl ether, glycerin-1-acetate, 2-chloro-1,3-propanediol, 3-chloro-1,2-propanediol, diethylene glycol, diethylene glycol ethyl methyl ether, diethylene glycol chlorohydrin, diethylene glycol diacetate, diethylene glycol diethyl ether, diethylene glycol dimethyl ether, diethylene glycol monomethyl ether, dipropylene glycol, dipropylene glycol monomethyl ether, and triethylene glycol.

The plasticizer may include at least one member selected from the group consisting of dimethyl phthalate, diethyl phthalate, dibutyl phthalate, diheptyl phthalate, di-n-octyl phthalate, di-2-ethylhexyl phthalate, octyldecyl phthalate, diisodecyl phthalate, and butylbenzyl phthalate.

The above object may also be achieved by a manufacturing method for a plasma display panel that includes a first panel and a second panel, the method having a structural layer formation step of forming a structural layer of the first panel, and a sealing step of sealing the first panel to the second panel and filling a space between the sealed panels with a gas medium. The structural layer formation step includes an application substep of applying an ink for a display panel to the first panel using an inkjet method, the ink including a powder material used in forming the structural layer, water or a water-miscible solvent, a binder formed from a water-soluble resin, and a plasticizer; and a baking substep of burning-off the binder and the plasticizer included in the applied ink.

According to this method for manufacturing the PDP, the ink retains flexibility after the ink is applied because of the plasticizer remaining in the ink, despite any dispersion or evaporation of the solvent that might occur. The uneven formation of the structural layer can thus be suppressed, since the retained flexibility of the ink allows the leveling process to occur over a prolonged period on time.

BEST MODE FOR CARRYING OUT THE INVENTION

Figure 1:
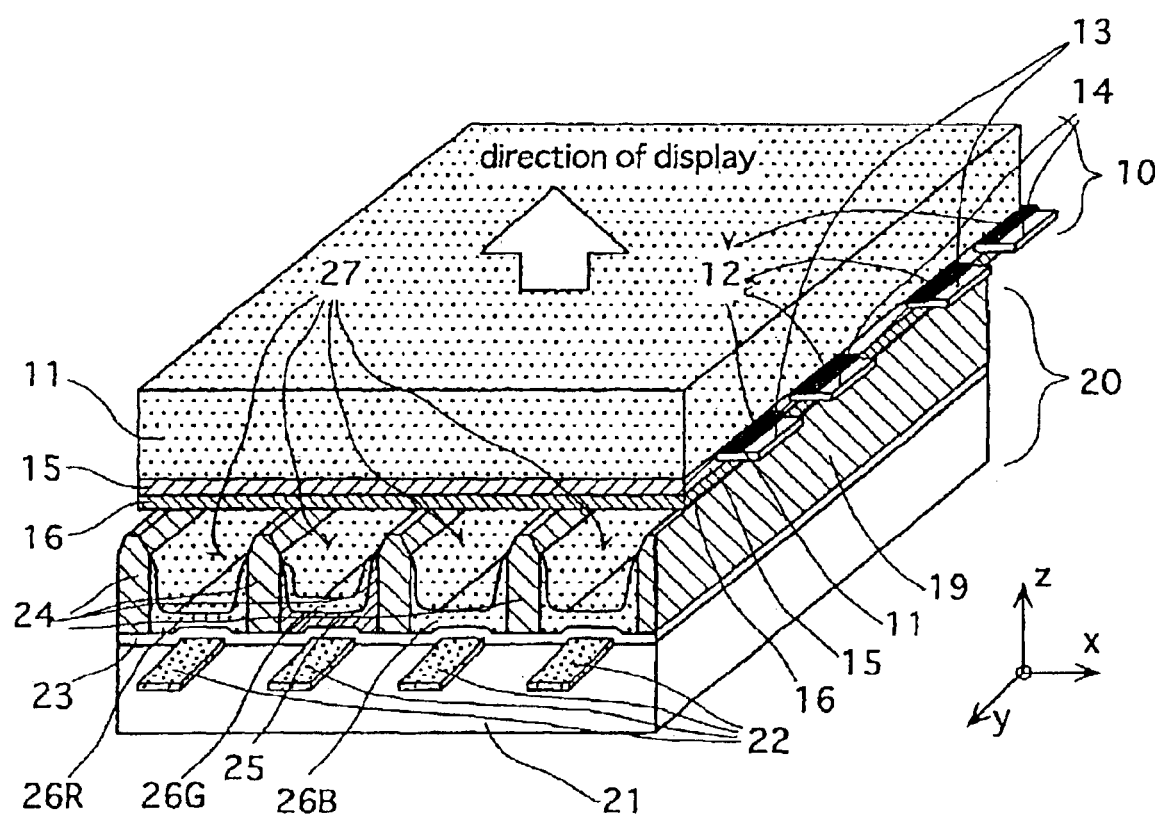
FIG. 1 is a partial cross-sectional perspective view of a PDP according to an embodiment of the present invention.
Figure 2:
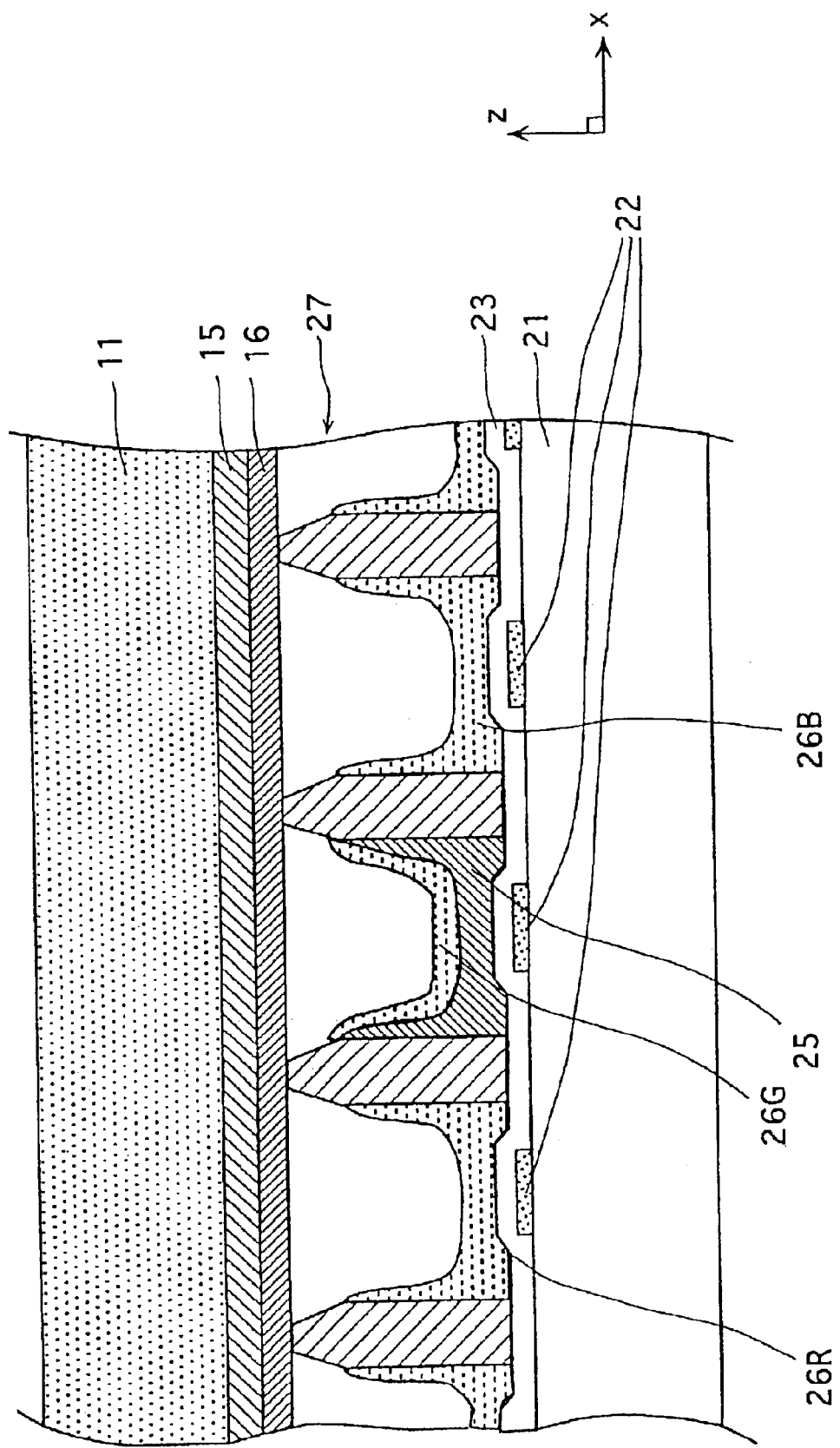
FIG. 2 is a partial cross-sectional view along a y-axis of the PDP in FIG. 1.
Figure 3:
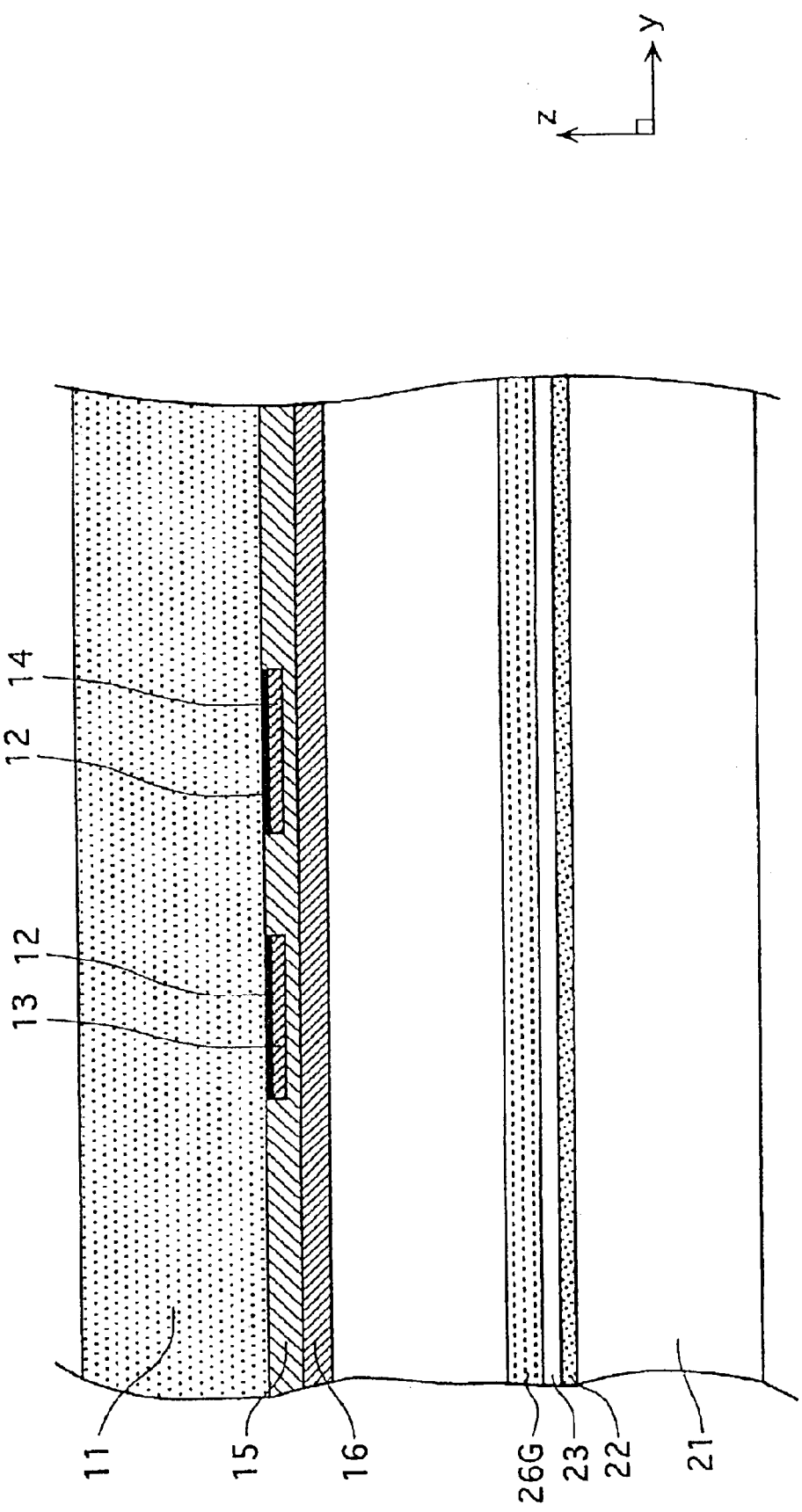
FIG. 3 is a partial cross-sectional view along an x-axis of the PDP in FIG. 1.

FIG. 1 is a partial cross-sectional perspective view of a PDP according to an embodiment of the present invention. FIG. 2 is a partial cross-sectional view along the y-axis of the PDP in FIG. 1. FIG. 3 is a partial cross-sectional view along the x-axis of the PDP in FIG. 1. In FIGS. 1 to 3, the z direction corresponds to a thickness of the PDP, and the x-y plane lies parallel to the panel surface of the PDP.

As shown in FIG. 1, the PDP comprises a front panel 10 and a back panel 20 arranged to face each other.

Front panel 10 includes a front glass substrate 11, shading films 12, plural pairs of display electrodes 13 and 14, a dielectric layer 15, and a protective layer 16. The pairs of display electrodes 13 and 14 are arranged on the facing surface of front panel 10, and shading films 12 are interposed between the display electrodes and front panel 10. Dielectric layer 15 and protective layer 16 are formed, in the stated order, on the facing surface of front panel 10 so as to cover the pairs of display electrodes.

Front glass substrate 11 is a flat substrate formed from a sodium borosilicate glass material, and is provided on the display side of front panel 10.

As shown in FIG. 3, shading films 12 are formed in a stripe pattern on front glass substrate 11, and are composed of frit glass and a black pigment that includes at least one member selected from the group consisting of RuO, NiO, TiO, TiO—$Al_2O_3$, and iron oxide. Shading films 12 serve to prevent glare caused by irradiated light from display electrodes 13 and 14 reflecting through front glass substrate 11 to the display side of front panel 10.

Display electrodes 13 and 14 are laminated on top of shading films 12, and a main component of the electrodes is silver (herein, a "main component" refers to 50 wt % of gross weight or greater). Apart from silver, it is alternatively possible to use metals such as gold, copper, chromium, nickel, and platinum as a main component of electrodes 13 and 14. Also, in order to secure a wide surface area in a cell, a combination electrode structure can be used in which a narrow silver electrode is laminated on top of a wide transparent electrode composed of a dielectric metal oxide such as ITO (indium tin oxide), $SnO_2$, or ZnO.

Dielectric layer 15 is formed so as to cover and thereby insulate display electrodes 13 and 14, and is composed of a glass component such as a lead oxide glass or a bismuth oxide glass. The lead oxide glass is a compound of materials such as lead oxide, boric oxide, silicon oxide, and aluminum oxide, and the bismuth oxide glass is a compound of materials such as bismuth oxide, zinc oxide, boric oxide, silicon oxide, and calcium oxide.

Protective layer 16 is formed so as to cover dielectric layer 15, and is composed of materials such as magnesium oxide (MgO), the MgO being formed in a (111) crystal orientation.

Returning to FIG. 1, back panel 20 includes a back glass substrate 21, address electrodes 22, a dielectric layer 23, barrier ribs 24, a reflective layer 25, and phosphor layers 26R, 26G, and 26B.

Back glass substrate 21 is, similar to front glass substrate 11, a flat substrate formed from a sodium borosilicate glass material. As shown in FIG. 2, address electrodes 22 are provided in a stripe pattern on the facing surface of back glass substrate 21.

Similar to display electrodes 13 and 14, a main component of address electrodes 22 is silver, and dielectric layer 23 is formed so as to cover and thereby insulate the address electrodes.

Dielectric layer 23 is a dielectric glass layer composed of the same glass component used to form dielectric layer 15 on front panel 10.

Reflective layer 25 is formed so as to cover the base and sides of the gap between adjacent barrier ribs 24 in which the phosphor layer 26B will be formed, and can be composed, for example, of a titanium oxide and the same glass component used to form dielectric layer 15. Reflective layer 25 serves both as a dielectric layer and also to reflect the visible light generated by phosphor layer 26B. The provision of reflective layer 25 to reflect the blue light generated by phosphor layer 26B helps to boost the relatively low brightness of the blue phosphor particles. In order to boost the overall brightness of the PDP, it is possible for reflective layer 25 to be provided in the rib gaps corresponding to not only phosphor layer 26B but also phosphor layers 26R and 26G.

Phosphor layers 26R, 26G, and 26B are formed from the binding together of phosphor particles corresponding to the colors red (R), green (G), and blue (B), respectively.

Front panel 10 and back panel 20 are fixed together and the perimeter of the panels is sealed using a sealing layer (not depicted) formed from frit glass. Spaces between the sealed front and back panels are then filled at a predetermined pressure (e.g. 66.5~106 kPa) with a discharge gas (e.g. a gas mixture of 95 wt % neon and 5 wt % xenon) to form discharge spaces 27.

Figure 4:
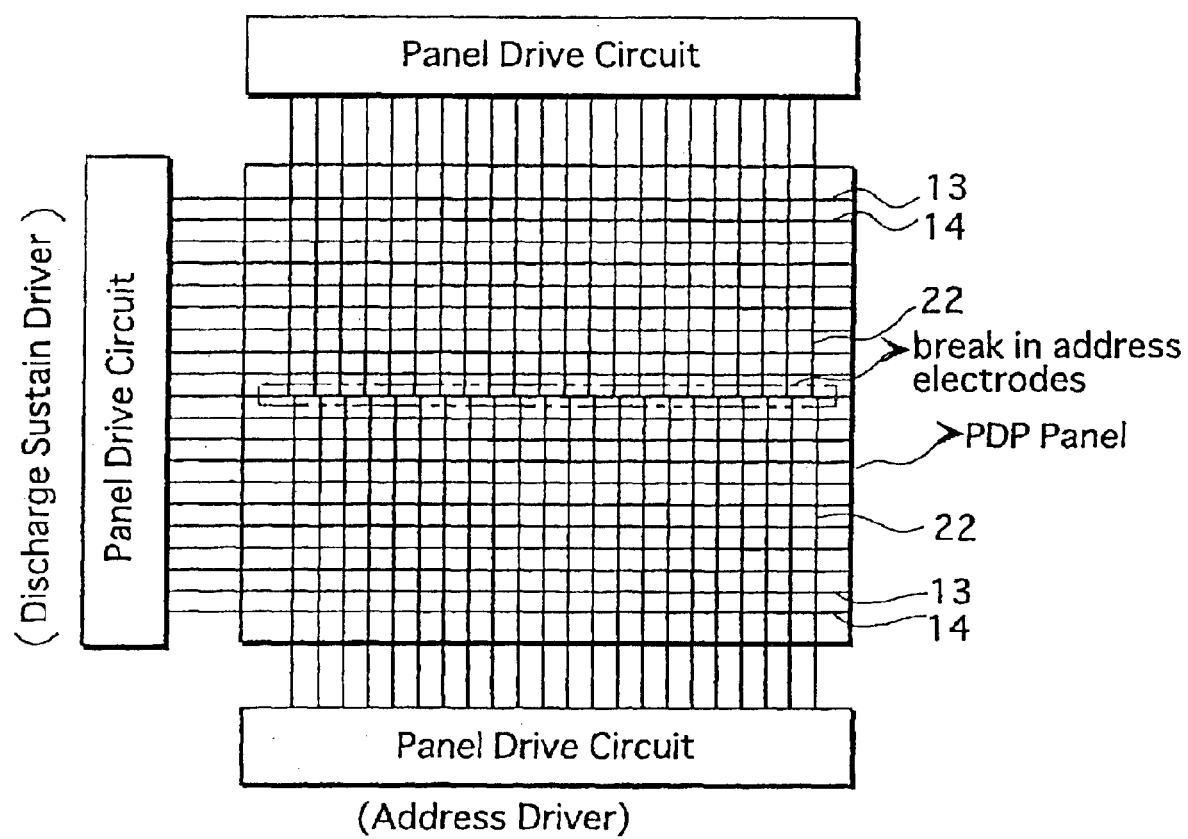
FIG. 4 shows drive circuits mounted in the PDP.

Whereas display electrodes 13 and 14 extend continuously from one end of the panel to the other, address electrodes 22 have, as shown in FIG. 4, a break in the middle that allows for duel scanning to be conducted.

Manufacturing Method for a PDP

Described below is a method for manufacturing a PDP.

1. Manufacture of Front Panel 10

In manufacturing front panel 10, display electrodes 13 and 14 are formed on front glass substrate 11 with shading films 12 interposed therebetween. Lead-based dielectric layer 15 is then coated over the display electrodes, and protective layer 16 is coated in turn over dielectric layer 15.

Shading films 12 are formed by using a screen-printing method to apply a paste composed of frit glass and a black pigment containing RuO, for example, in a stripe pattern to front glass substrate 11, and then baking the applied paste composite.

Display electrodes 13 and 14 include a silver component, and are formed by using the screen-printing method to apply a silver electrode paste on the shading films 12, and then baking the applied silver electrode paste.

Dielectric layer 15 is formed at a thickness of approximately 20 $\mu$m by using the screen-printing method to apply a composite paste over the display electrodes, and then baking the applied composite paste at 520° C. for 20 minutes. In addition to an organic binder ($\alpha$-terpineol with 10 wt % ethyl cellulose dissolved therein), the composite paste may contain, for example, 70 wt % lead oxide (PbO), 15 wt % boron oxide ($B_2O_3$), 10 wt % silicon oxide ($SiO_2$), and 5 wt % aluminum oxide.

Protective layer 16 is composed of a magnesium oxide (MgO), and although a sputtering method is conventionally used to form layer 16, in the present invention a CVD method is used to form layer 16 at a thickness of 1.0 $\mu$m. The formation of layer 16 using the CVD method involves setting front glass substrate 11 inside a CVD apparatus and feeding in a magnesium compound and oxygen as source chemicals in order to induce a reaction. The source chemicals may be acetylacetone magnesium ($Mg(C5H_7O_2)_2$) and cyclopentadienyl magnesium ($Mg(C_5H_5)_2$), for example.

2. Manufacture of Back Panel 20

Address electrodes 22 are formed on back glass substrate 21 using the same screen-printing method as that employed in forming display electrodes 13 and 14.

Dielectric layer 23 is formed by using the screen-printing method to apply a paste containing a lead-based glass material over address electrodes 22, and then baking the applied paste. It is also possible to mix $TiO_2$ particles in the paste to further enhance the reflection of the visible light emitted from the phosphor layers 26R, 26G, and 26B.

Barrier ribs 24 are formed by using the screen-printing method to repeatedly apply a barrier rib paste composed of a glass material over dielectric layer 23, and then baking the applied barrier rib paste. The barrier ribs thus formed are microscopic in size and have a porous composition.

Reflective layer 25 is formed by using the inkjet method to apply reflective layer ink in the gap between adjacent barrier ribs 24 in which phosphor layer 26B is to be formed, and then drying the applied reflective layer ink.

Phosphor layers 26R, 26G, and 26B are formed by using the inkjet method to apply phosphor ink in the gaps between adjacent barrier ribs 24, and then baking the applied phosphor layer ink. A detailed description of the manufacture of reflective layer 25 and phosphor layers 26R, 26G, and 26B is given in a later section.

In the present invention, the height and pitch of the barrier ribs are both set at 0.15 mm as required in a 40-inch class high-vision television.

3. Sealing of the Panels

The PDP is constructed by (i) using a sealing layer glass to seal together front panel 10 and back panel 20 around the perimeter of the panels, and (ii) filling a high vacuum (e.g. $8 \times 10^{-7}$ Torr) created within spaces partitioned by barrier ribs 24 with a discharge gas (e.g. an inert gas mixture of He—Xe or Ne—Xe) at a predetermined pressure (e.g. 66.5–106 kPa) to form discharge spaces 27.

To achieve image display, the PDP is driven using drive circuits mounted as shown in FIG. 4.

4. Formation of Reflective Layer 25

Reflective layer 25 is formed by using an inkjet method to apply reflective layer ink in the gap between adjacent barrier ribs 24 in which phosphor layer 26B is to be formed, and then drying the applied ink.

The reflective layer ink is composed of $TiO_2$ particles, dielectric glass particles, a binder, a solvent, and a plasticizer that are ground to a suitable viscosity using, for example, a three-roll mill.

In order to reduce the occurrence of nozzle clog and particle deposits, the $TiO_2$ particles preferably should have an average particle size in a range of 0.05 $\mu$m to 2.0 $\mu$m inclusive. Also, to optimize the reflectivity of the ink, the $TiO_2$ particles preferably should be present at approximately 40 wt % of the ink solution.

For the same reasons given in regard to the $TiO_2$ particles, the average particle size of the dielectric glass particles preferably should be in a range of 0.1 $\mu$m to 1.0 $\mu$m inclusive.

The binder is a water-soluble resin that includes, for example, at least one member selected from the group consisting of hydroxypropyl cellulose, hydroxyethyl cellulose, ethylhydroxyethyl cellulose, carboxymethyl cellulose, polyvinyl alcohol, and polyvinyl ether. In order to optimize the ink viscosity, the weight-average molecular weight of the one or more resins in the binder preferably should each be in a range of 30,000 to 100,000 inclusive, and the binder should be included in a range of 1 wt % to 20 wt % inclusive of the ink solution. Hydroxypropyl cellulose (weight-average molecular weight: approx. 80,000) and hydroxyethyl cellulose are particularly suitable for use in the binder.

The solvent preferably should be composed of water, or a water-miscible alcohol or alcohol derivative. If the solvent is a water-miscible alcohol or alcohol derivative, the solvent may include at least one member selected from the group consisting of ethylene glycol, ethylene glycol monoacetate, ethylene glycol monoethyl ether, ethylene glycol monobutyl ether, ethylene glycol monomethyl ether, ethylene glycol monomethyl ether acetate, 3-methoxy-3-methylbutanol, allylalcohol, isopropyl alcohol, ethanol, glycidol, tetrahydrofurfuryl alcohol, t-buthanol, furfuryl alcohol, propargyl alcohol, 1-propanol, methanol, 3-methyl-1-butyne-3-ol, 15-crown-5, 18-crown-6, propylene oxide, 1,4-dioxane, dipropyl ether, dimethyl ether, tetrahydrofuran, acetaldehyde, diacetone alcohol, methyl lactate, γ-butyl lactone, glycerin, glycerin-1,2-dimethyl ether, glycerin-1,3-dimethyl ether, glycerin-1-acetate, 2-chloro-1,3-propanediol, 3-chloro-1,2-propanediol, diethylene glycol, diethylene glycol ethyl methyl ether, diethylene glycol chlorohydrin, diethylene glycol diacetate, diethylene glycol diethyl ether, diethylene glycol dimethyl ether, diethylene glycol monomethyl ether, dipropylene glycol, dipropylene glycol monomethyl ether, and triethylene glycol. The appropriate solvent should be determined according to the viscosity of the ink and the solubility of the binder. In terms of the present embodiment, a particularly suitable mixture would include at least one member selected from the group consisting of ethylene glycol monomethyl ether acetate, ethylene glycol, 3-methoxy-3-methylbutanol, and ethylene glycol monobutyl ether. The solvent preferably should be present at approximately 50 wt % of the ink solution.

The plasticizer may be at least one member selected from the group consisting of dimethyl phthalate, diethyl phthalate, dibutyl phthalate, diheptyl phthalate, di-n-octyl phthalate, di-2-ethylhexyl phthalate, octyldecyl phthalate, diisodecyl phthalate, and butylbenzyl phthalate. To achieve a favorable leveling of the ink, the plasticizer preferably should be included in a range of 0.5 wt % to 10 wt % inclusive of the ink at the time of application. At concentrations below 0.5 wt % not enough leveling occurs, and at concentrations above 10% too much leveling occurs. In terms of the present embodiment, it is particularly desirable for the plasticizer to include approximately 6 wt % dibutyl phthalate in order to optimize the viscosity and leveling qualities of the ink.

The viscosity of the reflective layer ink preferably should be in a range of 0.3 Pa.s (300 cP) to 50 Pa.s (50,000 cP) inclusive. At viscosities of less than 0.3 Pa.s the applied ink is too thin to maintain the desired form, and at viscosities of greater than 50 Pa.s the applied ink is too viscous to be effectively discharged from the nozzle of the ink application apparatus. In terms of the present embodiment, the optimal viscosity is approximately 3.5 Pa.s.

Figure 5:
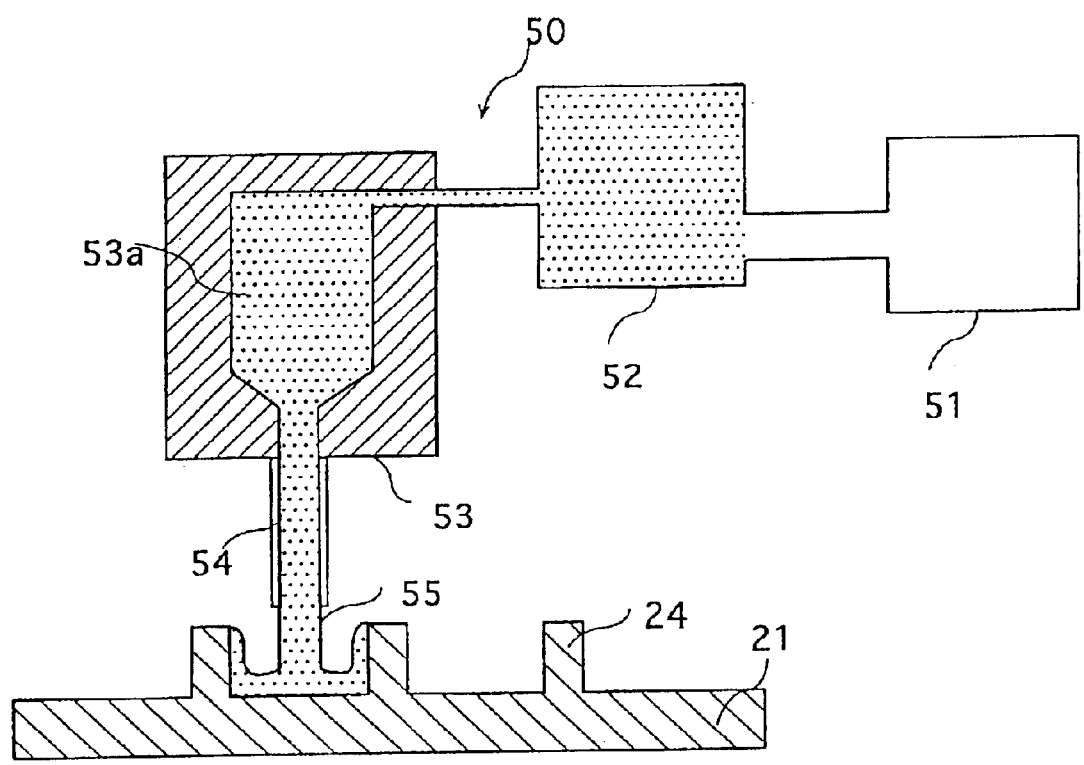
FIG. 5 is a schematic structural view of an ink application apparatus used in forming a reflective layer and a phosphor layer of the PDP.

FIG. 5 is a schematic structural view of an ink application apparatus 50 used in forming reflective layer 25.

As shown in FIG. 5, an ink server 51 stores the reflective layer ink, and a pressure pump 52 supplies the ink to an ink head 53 by applying pressure to the stored ink. Ink head 53 includes an ink chamber 53a and a nozzle 54, and the ink supplied to ink chamber 53a is ejected in a continuous stream from nozzle 54. A plurality of nozzles 54 is provided (only one depicted in FIG. 5) so as to allow for the plural application of reflective layer ink at any one time.

Ink head 53 is formed in one piece (i.e. to include both ink chamber 53a and nozzle 54) by machining and electrodischarge machining a metal material.

The aperture of nozzle 54 preferably should be 45 $\mu$m or greater so as to prevent the nozzle from clogging. Generally, an aperture in a range of 45 $\mu$m to 150 $\mu$m inclusive is preferred, since the nozzle aperture is then smaller than the gap between adjacent barrier ribs 24. In terms of the present embodiment, a nozzle aperture of 100 $\mu$m is used due to the rib gap being set at 150 $\mu$m.

In order to prevent the ink particles forming a deposit in ink server 51, an agitator (not depicted) attached within the ink server is used to mix the stored ink.

The pressurization of pressure pump 52 is adjusted so that the ink ejected from nozzle 54 flows in a continuous stream.

Ink head 53 scans over back glass substrate 21 in a direction parallel to barrier ribs 24. In the present embodiment, the scanning by ink head 53 is conducted by a scan mechanism (not depicted) that drives ink head 53 in a linear direction over back glass substrate 21. However, ink head 53 may be fixed in place and back glass substrate 21 may be moved in a linear direction under the fixed ink head 53.

Reflective layer ink is applied in the gap in which the blue phosphor layer 26B will be formed between adjacent barrier ribs 24 by ejecting ink from nozzle 54 so as to form a continuous ink flow 55 (jet line) while scanning ink head 53 over back glass substrate 21 in a direction parallel to barrier ribs 24.

Moisture in the reflective layer ink and moisture absorbed from the air serves to prevent the ink from becoming charged as a result of shearing stress caused when the ink particles (e.g. $TiO_2$ particles, dielectric glass particles, etc.) are discharged through the tubing and nozzle of ink application apparatus 50. The moisture in the ink and the moisture-absorbing qualities of the ink can be attributed to the binder being a water-soluble resin and the solvent being water or a water-miscible solvent. Since the charging of the reflective layer ink is prevented, the ink can be discharged accurately without the deterioration in precision that occurs with prior art technology. As a result, the ink can be applied as desired in the gap between adjacent barrier ribs 24.

FIGS. 6A to 6D are schematic cross-sectional views of barrier ribs 24 on back panel 20 that show the processes involved in forming the reflective and phosphor layers in the gap between adjacent barrier ribs 24.

Figure 6A:
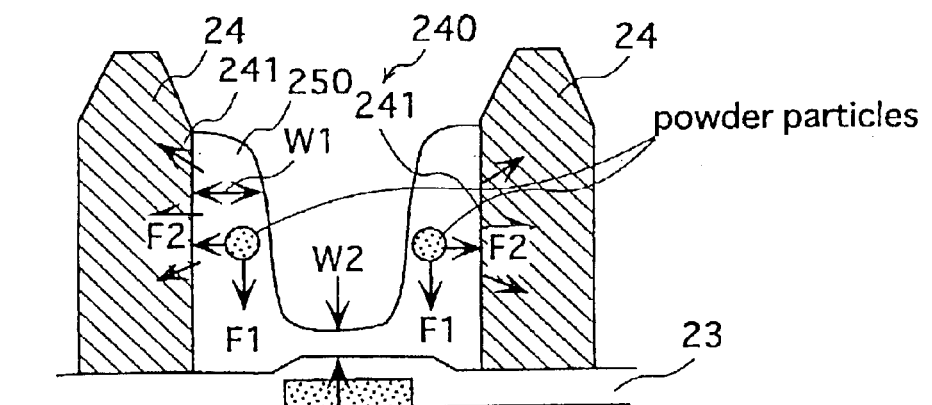
FIGS. 6A–6D are enlarged cross-sectional views of a main section of a back panel of the PDP showing the processes involved in forming the reflective and phosphor layers.

As shown in FIG. 6A, reflective layer ink 250 applied in the gap 240 between barrier ribs 24 adheres in a "U" shape to the rib walls 241 and base of gap 240 as a result of the force with which ink flow 55 is ejected. When the ink is initially applied, the thickness W1 of reflective layer ink 250 on rib walls 241 is greater than the thickness W2 of the ink on the base of gap 240. Due to evaporation and also the dispersion of the solvent into rib walls 241 of the porous barrier ribs, the concentration of solvent in ink 250 is reduced after application. On the other hand, the greater molecular weight of the plasticizer in comparison to both alcohol and water, makes the plasticizer less prone to evaporation and dispersion, and therefore high concentrations of plasticizer remain in the water-soluble resin after application. The plasticizer helps to maintain the flexibility of the resin by weakening the coherence of the resin particles, and as a result the applied ink levels over time according to a process commonly known as "leveling."

As shown in FIG. 6, downward forces F1 and sideward forces F2 work on the particles (e.g. $TiO_2$ particles, dielectric glass particles, etc.) included in reflective layer ink 250. In particular, the sideward forces F2 exert a great deal of force on the particles close to rib walls 241.

Figure 6B:
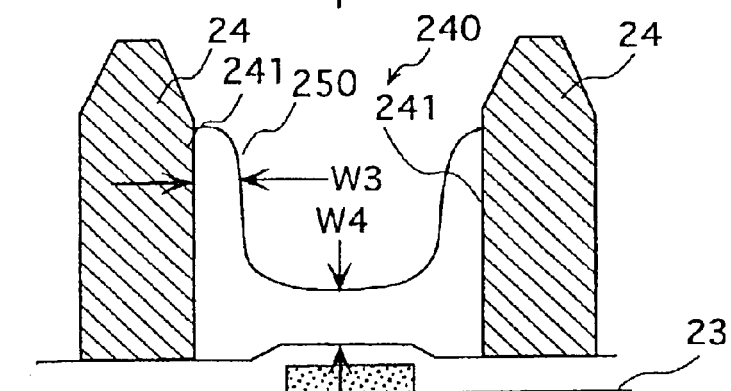

The final form that the ink takes in the gap between barrier ribs 24 is determined by balancing the gravitational forces F1 and F2. In the prior art, the ink is formed thicker on the rib walls 241 than on the base of the gap because of the increased coherence of the resin particles resulting from the reduction in solvent concentration levels. According to the present embodiment, however, a plasticizer is included in ink 250, and this allows ink 250 to retain a low viscosity because of the plasticizer remaining in the ink after application, despite the evaporation and dispersion of the solvent. The coherence of the resin particles is reduced as a result, and this allows for a reduction in the gravitation pull of sideward forces F2. Because of the leveling that consequently occurs, some of reflective layer ink 250 applied to rib walls 241 is shifted, as shown in FIG. 6B, to the base of gap 240 by downward forces F1. Consequently, the thickness of the ink on rib walls 241 is reduced from W1 (FIG. 6A) to W3, and the ink thickness on the base of gap 240 is increased from W2 (FIG. 6A) to W4. The aperture ratio of the PDP according to the present embodiment is thus increased in comparison to the prior art, and brightness levels are improved.

The formation of reflective layer 25 is completed by drying the reflective layer ink 250 applied as described above.

5. Formation of the Phosphor Layers

The viscosity of the phosphor ink is adjusted as required by using a three-roll mill to homogenize and disperse the phosphor particles, binder, plasticizer, and solvent included in the ink.

The phosphor particles may be the same as those conventionally used in the formation of PDP phosphor layers. For example, the composition of the red (R), green (G), and blue (B) phosphors may be as follows:

| | |
|---|---|
| Red phosphors: | $(Y_xGd_{1-x})BO_3:Eu^{3+}$ or $YBO_3:Eu^{3+}$ |
| Green phosphors: | $BaAl_{12}O_{19}:Mn$ or $ZnSiO_4:Mn$ |
| Blue phosphors: | $BaMgAl_{10}O_{17}:Eu^{2+}$ |

In order to reduce the occurrence of nozzle clog and particle deposits, the average particle size of the phosphor particles preferably should be less than or equal to 7 μm. Smaller phosphor particles help to enhance luminous efficiency and are therefore preferred, although for ease of handling the phosphor particles preferably should have an average particle size of at least 0.5 μm. In terms of the present embodiment, phosphor particles in a range of 0.5 μm to 7 μm inclusive are suitable, although the preferred range is 2 μm to 3 μm inclusive. In the present embodiment, the phosphor particles are present at approximately 43 wt % of the phosphor ink.

The binder included in the phosphor ink may be the same as that used in the formation of reflective layer 25. In order to maintain a suitable viscosity of the phosphor ink, the binder preferably should be included in the ink in a range of 1 wt % to 20 wt % inclusive. In the present embodiment, the binder is present at approximately 5 wt % of the phosphor ink. A water-soluble resin may be used as the binder, and a water-soluble cellulose is preferred because of the minimal residue remaining after the ink is baked. Although cellulose is generally considered to be fairly heat resistant due to its high decomposition temperature, our experimentation has shown that almost no residue remains after the baking process, even at conventional baking temperatures.

The plasticizer included in the phosphor ink may be the same as that used in forming reflective layer 25. In the present invention, it is particularly desirable for dibutyl phthalate to be present at approximately 18 wt % of the ink so as to optimize the ink viscosity.

The solvent included in the phosphor ink may be the same as that used in forming reflective layer 25. A solvent mixture including ethylene glycol monomethyl ether acetate, ethylene glycol, 3-methyl-3-methoxybutanol, and butyl carbitol is particularly suitable. The solvent preferably should be present at approximately 34 wt % of the phosphor ink.

The phosphor ink is manufactured by dissolving the binder in the solvent, adding suitable quantities of phosphor particles and plasticizer, and grinding the mixture using a three-roll mill. The viscosity of the phosphor ink preferably should be in a range of 0.3 Pa.s (300 cP) to 50 Pa.s (50,000 cP) inclusive. At viscosities of less than 0.3 Pa.s the applied ink is too thin to maintain the desired form, and at a viscosities of greater than 50 Pa.s the applied ink is too viscous to be effectively discharged from the nozzle of the ink application apparatus. In particular, a viscosity in a range of 1 Pa.s to 50 Pa.s inclusive is preferred.

Phosphor ink 260 may be applied in the same way as reflective layer ink 250 using ink application apparatus 50.

Specifically, the phosphor ink may be applied between adjacent barrier ribs 24 on back glass substrate 21 by ejecting the ink so as to form a continuous ink flow 55 (jet line) from nozzle 54 while scanning ink header 53 over substrate 21 in a direction parallel to barrier ribs 24. This process is repeated for each of the phosphor layers red (R), green (G), and blue (B), respectively. As a result, the red (R) and green (G) phosphor ink is applied as shown in FIG. 6A.

Figure 6C:
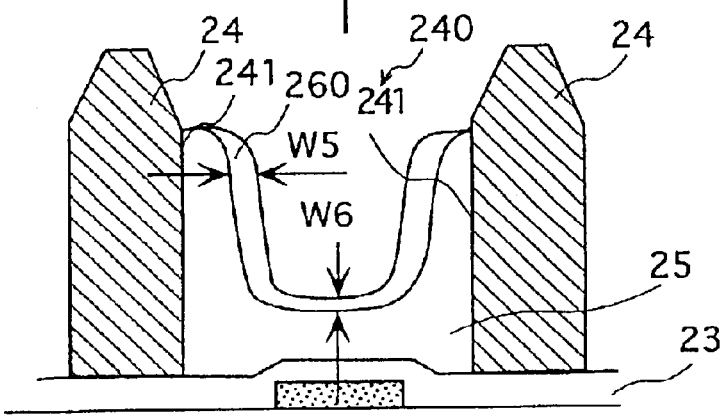

On the other hand, the blue (B) phosphor ink is applied on reflective layer 25 as shown in FIG. 6C. As with the application of reflective layer 25, the application of the blue (B) phosphor ink results in the ink thickness W5 on rib walls 241 being greater than the ink thickness W6 on the base of gap 240.

Figure 6D:
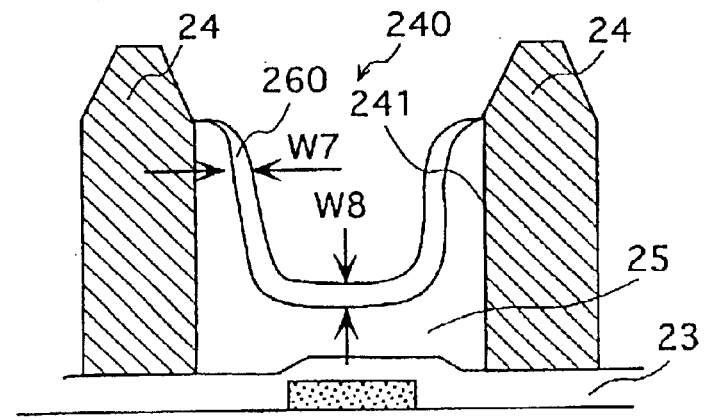

In forming reflective layer 25, the inclusion of the plasticizer in phosphor ink 260 allows the ink to retain a low viscosity, despite any evaporation or dispersion of the solvent. As a result of the leveling that consequently occurs, some of the ink 260 on the rib walls 241 flows to the base of gap 240. As shown in FIG. 6D, the ink thickness on the walls is reduced from W5 to W7, and the ink thickness on the base is increased from W6 to W8.

The formation of phosphor layers 26R, 26G, and 26B is completed by drying the red, green, and blue phosphor inks applied respectively in predetermined gaps between adjacent barrier ribs 24, and baking (approx. 500° C. for 10 min.) the panel.

As a result of the baking process, most of the solvent in the ink is eliminated. Most of the binder in the ink is also eliminated despite the decomposition temperature of the binder used in the present embodiment being higher than that of conventional binders. Also, much of the plasticizer included in the ink either evaporates or is burnt off, and little remains after the baking process. To optimize luminous efficiency, the thickness of the phosphor layers 26R, 26G, and 26B preferably should be 10 to 20 times the average particle size of the phosphor particles in ink 260. The thickness the phosphor layers can be adjusted by adjusting the composition ratio of phosphor ink 260.

Effects of the Present Embodiment

As described above, when ink is applied using the inkjet method, the uneven adhesion of the ink can be reduced and the accuracy of the ink discharged from the nozzle of the ink application apparatus can be improved by using a water-soluble resin as the binder in the ink, and water, a water-miscible alcohol derivative, or the alcohol derivative mixed with water as the solvent in the ink, and then adding a plasticizer to the ink.

In other words, because the solvent conventionally used in the ink is not water-miscible, it is not possible to reduce the charging of the ink when the particles in the ink became charged. In comparison, the water-miscibility of the solvent used in the present embodiment allows the ink to absorb moisture from the air, and thereby reduce any charging that occurs when the ink is ejected from the nozzle of the ink application apparatus. As a result, the accuracy of the ink ejected from the nozzle can be maintained. Furthermore, with the conventional phosphor ink, the charging of the ink often results in a rise forming in the phosphor layer over the point corresponding to the break in the address electrodes. However, the charging-prevention quality of the ink of the present embodiment allows for this rise to be eliminated. Moreover, by including the plasticizer in the ink, the low viscosity of the ink can be maintained, despite any reductions in solvent concentrations due to evaporation or dispersion of the solvent after application. Consequently, by using the reflective layer ink and phosphor ink of the present invention, it is possible to achieve the desired thickness of the reflective and phosphor layers on the rib walls. As a result, increases in the cell aperture ratio of the PDP can be realized.

Since the nozzle through which the phosphor ink is discharged is only a couple of dozen nanometers in diameter, the use of conventional solvents and binders often leads to a gelling of non-dissolved particles in the binder, and consequently the clogging of the nozzle. However, the excellent dissolution qualities of the binder included in the phosphor ink of the present embodiment allows for nozzle clogging to be reduced. As a result, the ink can be applied continuously over an extended period of time.

In addition to the above effects, the water-soluble phosphor ink also exhibits excellent characteristics in the washing process. Specifically, the use of the conventional organic phosphor ink requires that an organic solvent be used in the washing process, which raises questions relating to the environment and the treatment of waste products, not to mention the safely and health of those handling the solvent. In contrast, the water-soluble phosphor ink of the present embodiment requires the use of only water and a minimal amount of organic solvent in the washing process. Therefore, the handling of the ink is considerably improved in comparison to the conventional organic phosphor ink, and environmental benefits are anticipated. Also, the phosphors washed away in the washing process can be collected easily and safely.

EMBODIMENT EXAMPLES

Embodiment Samples 1 to 7

Embodiment sample PDPs 1 to 7 were manufactured in which the phosphor layers were formed by using an inkjet method to apply a phosphor ink that included, at the levels shown in Table 1, a powder material, a water-soluble resin, a solvent, and a plasticizer, and then drying and baking the applied ink.

TABLE 1

|  | Phosphors (wt %) | Resin (wt %) | Solvent (wt %) | Plasticizer (wt %) |
| --- | --- | --- | --- | --- |
| Comparative Sample | 42 | 5 | 53 | 0 |
| Embodiment Sample 1 | 42 | 5 | 52.5 | 0.5 |
| Embodiment Sample 2 | 42 | 5 | 52 | 1 |
| Embodiment Sample 3 | 42 | 5 | 51 | 2 |
| Embodiment Sample 4 | 42 | 5 | 49 | 4 |
| Embodiment Sample 5 | 42 | 5 | 45 | 8 |
| Embodiment Sample 6 | 42 | 5 | 43 | 10 |
| Embodiment Sample 7 | 42 | 5 | 41 | 12 |

The phosphors included in the phosphor ink were red phosphors (Y, Gd) $BO_3$:Eu, and the resin was ethylhydroxyethyl cellulose having a weight-average molecular weight of 80,000. The solvent was a mixture containing equals amounts of ethylene glycol monomethyl ether acetate, ethylene glycol, 3-methoxy-3-methylbutanol, and butyl carbitol. The plasticizer was butyl phthalate.

The PDP was a 42-inch class model having barrier ribs 24 of 120 μm in height and gaps between adjacent barrier ribs of 150 μm in breadth. A reflective layer was not provided.

Comparative Sample

As shown in Table 1, a comparative sample PDP was manufactured using the same method as in embodiment samples 1 to 7, except that a plasticizer was not included in the phosphor ink.

Measured Results and Related Considerations

With respect to embodiment samples 1 to 7 and the comparative sample, the thickness of the phosphor layer was measured on the rib walls (at a position 30 μm down from the top of the barrier ribs) and at the base of the gap between adjacent barrier ribs. The measurement results are shown in Table 2.

TABLE 2

|  | Phosphor Layer Thickness (base) μm | Phosphor Layer Thickness (rib wall) μm |
| --- | --- | --- |
| Comparative Sample | 3–5 | 20–25 |
| Embodiment Sample 1 | 7–9 | 18–22 |
| Embodiment Sample 2 | 10–17 | 17–21 |
| Embodiment Sample 3 | 18–22 | 16–20 |
| Embodiment Sample 4 | 26–28 | 14–18 |
| Embodiment Sample 5 | 27–30 | 12–15 |
| Embodiment Sample 6 | 28–30 | 12–15 |
| Embodiment Sample 7 | 31–35 | 8–12 |

As shown by the results in Table 2, the thickness of the phosphor layer on the rib walls is reduced and the thickness on the base of the gap between adjacent barrier ribs is increased for each of the embodiment samples in comparison to the comparative sample. Furthermore, the results show that the flexibility retained by the ink at plasticizer levels of 0.5 wt % or greater allows some of the phosphors adhering to the rib walls after the ink is applied to flow down to the base of the gap between adjacent barrier ribs. Plasticizer levels of 4 wt % to 8 wt % are shown to yield the best results, while plasticizer levels of greater than 10 wt % make the ink too flexible, resulting in an overly thin phosphor layer on the rib walls and an overly thick phosphor layer on the base of the gap between adjacent barrier ribs.

In the embodiment samples, the accuracy of the ink discharged from the nozzle of the ink application apparatus using the inkjet method is maintained. This effect is attributed to the fact that the phosphor ink includes a water-soluble resin and a water-miscible solvent, which allows the ink to absorbed moisture from the air ink when ejected from the nozzle of the ink application apparatus, thereby allowing any charge stored in the ink to be discharged.

Variations

In the embodiment as described above, the inkjet method and ink application apparatus 50 are used in forming reflective layer 25 and phosphor layers 26R, 26G, and 26B. However, the inkjet method and ink application apparatus 50 may also be used in to apply ink used in the formation of shading films 12, display electrodes 13 and 14, address electrodes 22, and the sealing layer, etc.

Figure 7A:
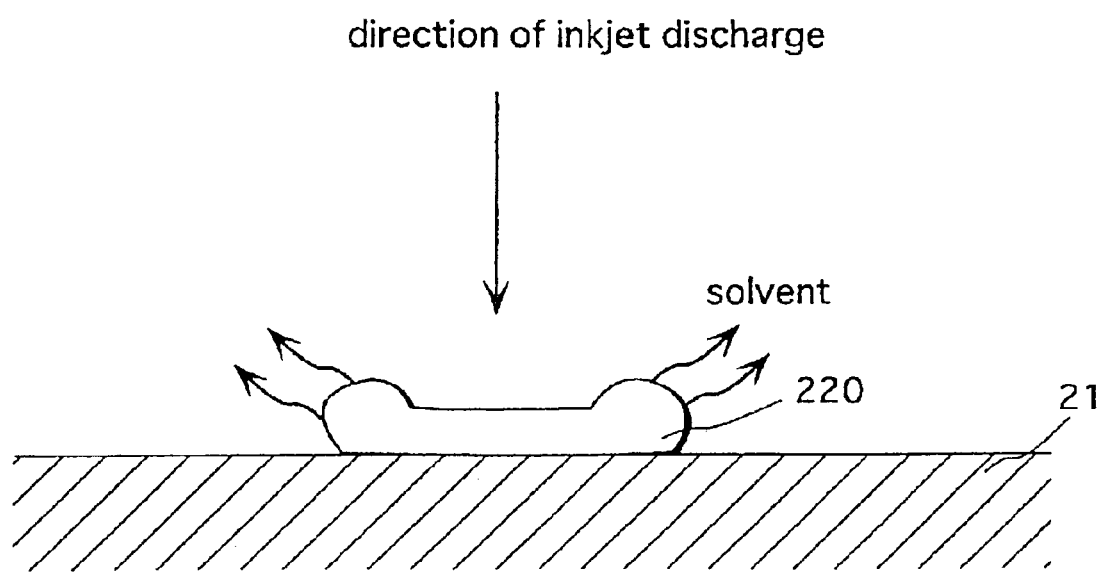
FIGS. 7A and 7B show an application pattern of the ink used in forming a silver electrode of the PDP according to a variation of the present invention.
Figure 7B:
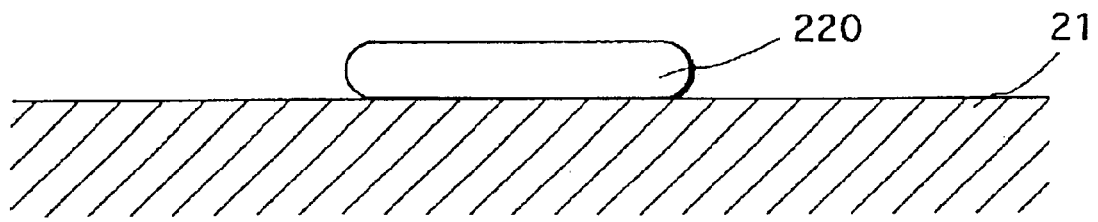

FIGS. 7A and 7B show the application of a silver electrode ink 220 in forming an address electrode 22 of back panel 20.

As shown in FIG. 7A, the force at which silver electrode ink 220 is discharged from ink application apparatus 50 (not depicted) is such that a cross-sectional view shows the outer sides of the applied ink to be thicker than a middle area. If a plasticizer is not included in silver electrode ink 220, the viscosity of the ink will increase as the solvent in the ink dries, and as a result address electrode 22 will be formed in the shape of the ink as initially applied. However, as shown in FIG. 7B, leveling of the applied ink occurs when a plasticizer is included in silver electrode ink 220, and a cross-sectional view shows the ink to be evenly distributed. As a result, the formation of electrodes having an uneven thickness can be reduced.

The same effects as described above can be anticipated when the ink is used to form shading films 12, display electrodes 13 and 14, and the sealing layer.

The ink used in forming shading films 12 preferably should be a mixture composed of (i) a black pigment that includes at least one member selected from the group consisting of RuO, NiO, TiO, TiO—$Al_2O_3$, and iron oxide, (ii) a frit glass having an average particle size in a range of 0.1 μm to 1 μm inclusive, and (iii) the same solvent and binder used in forming reflective layer 25 and phosphor layers 26R, 26G, and 26B. In particular, if the gross weight of the binder included in the ink exceeds 20 wt %, the ink will be too viscous, and thus the flow of the ink from the nozzle of the ink application apparatus will be inhibited. Conversely, if the gross weight of the binder is less than 1 wt %, the ink will not be viscous enough, and thus the applied ink will not retain the desired form. As such, the binder preferably should be included in a range of 1 wt % to 20 wt % inclusive of the ink.

The ink used in forming the display electrodes and address electrodes preferably should be a mixture composed of silver particles having an average particle size of 0.5 μm to 3 μm, and the same binder and solvent used in forming reflective layer 25 and phosphor layers 26R, 26G, and 26B. For the same reasons given above in regard to the formation of shading films 12, the binder preferably should be included in a range of 1 wt % to 20 wt % inclusive of the ink.

The ink used in forming the sealing layer preferably should be a mixture composed of frit glass having an average particle size of 0.1 μm to 1 μm, and the same binder and solvent used in forming reflective layer 25 and phosphor layers 26R, 26G, and 26B. For the same reasons given above in regard to the formation of the shading films 12, the binder preferably should be included in a range of 1 wt % to 20 wt % inclusive of the ink. The sealing layer is formed by using an inkjet method to apply the ink around the perimeter of one of the front panel and the back panel.

The present invention is also applicable, for example, in forming the backlight of a liquid crystal display (LCD) panel. In this case, the nozzle of the ink application apparatus preferably should be a slit nozzle, and a phosphor ink composed of a mixture of red, green, and blue phosphors that radiates a white light preferably should be applied to the panel surface of the LCD.

According to this structure, the same effects as described above for the embodiment of the present invention can be achieved.

INDUSTRIAL APPLICABILITY

The ink of the present invention is applicable in the manufacture of display panels used in computers, televisions, and the like, and is particularly suitable for use in the manufacture of display panels requiring high definition.

What is claimed is:

1. An ink for a display panel that is applied to a substrate of the display panel using an inkjet method, comprising:
   a powder material used in forming a structural layer of the display panel;
   water or a water-miscible solvent;
   a binder formed from a water-soluble cellulose; and
   a plasticizer.

2. The ink of claim 1, wherein
   the binder is included in a range of 1 wt % to 20 wt % inclusive of the ink at a time of application.

3. The ink of claim 2, wherein
   the plasticizer is included in a range of 0.5 wt % to 10 wt % inclusive of the ink at a time of application.

4. The ink of claim 2, wherein
   the structural layer is a phosphor layer, and
   the powder material includes phosphor particles having an average particle size in a range of 0.5 μm to 7 μm inclusive.

5. The ink of claim 2, wherein,
the structural layer is a reflective layer, and
the powder material includes a white pigment having an average particle size in a range of 0.05 µm to 2 µm inclusive, and a glass frit material having an average particle size in a range of 0.1 µm to 3 µm inclusive.

6. The ink of claim 5, wherein
the white pigment includes at least one member selected from the group consisting of titanium oxide, barium nitride, and alumina oxide.

7. The ink of claim 2, wherein
the structural layer is a silver electrode, and
the powder material includes a silver particle material having an average particle size in a range of 0.1 µm to 3 µm inclusive, and a glass frit material having an average particle size in a range of 0.1 µm to 1 µm inclusive.

8. The ink of claim 2, wherein
the structural layer is a shading film, and
the powder material includes a black pigment, and a glass frit material having an average particle size in a range of 0.1 µm to 1 µm inclusive.

9. The ink of claim 8, wherein
the black pigment includes at least one member selected from the group consisting of RuO, NiO, TiO, TiO—$Al_2O_3$, and iron oxide.

10. The ink of claim 2, wherein
the structural layer is a sealing layer, and
the powder material includes a glass frit material having an average particle size in a range of 0.1 µm to 3 µm inclusive.

11. The ink of claim 2, wherein
the water-soluble cellulose includes at least one member selected from the group consisting of hydroxypropyl cellulose, hydroxyethyl cellulose, ethylhydroxyethyl cellulose, and carboxymethyl cellulose, and has a weight-average molecular weight in a range of 30,000 to 100,000 inclusive.

12. The ink of claim 2, wherein
the water-miscible solvent includes at least one member selected from the group consisting of ethylene glycol, ethylene glycol monoacetate, ethylene glycol monoethyl ether, ethylene glycol monobutyl ether, ethylene glycol monomethyl ether, ethylene glycol monomethyl ether acetate, 3-methoxy-3-methylbutanol, allylalcohol, isopropyl alcohol, ethanol, glycidol, tetrahydrofurfuryl alcohol, t-buthanol, furfuryl alcohol, propargyl alcohol, 1-propanol, methanol, 3-methyl-1-butyne-3-ol, 15-crown-5, 18-crown-6, propylene oxide, 1,4-dioxane, dipropyl ether, dimethyl ether, tetrahydrofuran, acetaldehyde, diacetone alcohol, methyl lactate, γ-butyl lactone, glycerin, glycerin-1,2-dimethyl ether, glycerin-1,3-dimethyl ether, glycerin-1-acetate, 2-chloro-1,3-propanediol, 3-chloro-1,2-propanediol, diethylene glycol, diethylene glycol ethyl methyl ether, diethylene glycol chlorohydrin, diethylene glycol diacetate, diethylene glycol diethyl ether, diethylene glycol dimethyl ether, diethylene glycol monomethyl ether, dipropylene glycol, dipropylene glycol monomethyl ether, and triethylene glycol.

13. The ink of claim 2, wherein
the plasticizer includes at least one member selected from the group consisting of dimethyl phthalate, diethyl phthalate, dibutyl phthalate, diheptyl phthalate, di-n-octyl phthalate, di-2-ethylhexyl phthalate, octyldecyl phthalate, diisodecyl phthalate, and butylbenzyl phthalate.

14. A manufacturing method for a plasma display panel that includes a first panel and a second panel, the method having a structural layer formation step of forming a structural layer of the first panel, and a sealing step of sealing the first panel to the second panel and filling a space between the sealed panels with a gas medium, wherein the structural layer formation step has:

an application substep of applying an ink for a display panel to the first panel using an inkjet method, the ink including a powder material used in forming the structural layer, water or a water-miscible solvent, a binder formed from a water-soluble resin, and a plasticizer; and a baking substep of burning-off the binder and the plasticizer included in the applied ink.

15. A manufacturing method for a plasma display panel that includes a panel having a plurality of porous barrier ribs formed in rows, the method having a phosphor layer formation step of forming a phosphor layer in a rib gap between adjacent barrier ribs, wherein the phosphor layer formation step has:

an application substep of applying the phosphor layer ink of claim 4 in the rib gap using the inkjet method; and a baking substep of burning-off the binder and the plasticizer included in the applied phosphor layer ink.

16. The manufacturing method of claim 15, wherein
a viscosity of the reflective layer ink is a range of 1 Pa.s to 50 Pa.s inclusive.

17. A manufacturing method for a plasma display panel that includes a panel, the method having a silver electrode formation step of forming a silver electrode on a principal surface of the panel, wherein the silver electrode formation step has:

an application substep of applying the silver electrode ink of claim 7 to the principal surface of the panel using the inkjet method; and a baking substep of burning-off the binder and the plasticizer included in the applied silver electrode ink.

18. An ink for a display panel that is applied to a substrate of the display panel using an inkjet method, comprising:

a powder material used in forming a structural layer of the display panel;

water or a water-miscible solvent;

a binder formed from a water-soluble resin is included in a range of 1 wt % to 20 wt % inclusive of the ink at a time of application; and a plasticizer, wherein the structural layer is a reflective layer, and the powder material includes a white pigment having an average particle size in a range of 0.05 µm to 2 µm inclusive, and a glass frit material having an average particle size in a range of 0.1 µm to 3 µm inclusive.

19. The ink of claim 18, wherein
the white pigment includes at least one member selected from the group consisting of titanium oxide, barium nitride, and alumina oxide.

20. The ink of claim 18, wherein
the plasticizer is included in a range of 0.5 wt % to 10 wt % inclusive of the ink at a time of application.

21. An ink for a display panel that is applied to a substrate of the display panel using an inkjet method, comprising:

a powder material used in forming a structural layer of the display panel;

water or a water-miscible solvent;

a binder formed from a water-soluble resin is included in a range of 1 wt % to 20 wt % inclusive of the ink at a time of application; and a plasticizer, wherein the structural layer is a shading film, and the powder material includes a black pigment and a glass frit material having an average particle size in a range of 0.1 $\mu$m to 1$\mu$m inclusive.

22. The ink of claim 21, wherein the black pigment includes at least one member selected from the group consisting of RuO, NiO, TiO, TiO-$Al_2O_3$, and iron oxide.

23. The ink of claim 21, wherein the plasticizer is included in a range of 0.5 wt % to 10 wt % inclusive of the ink at a time of application.

24. A manufacturing method for a plasma display panel that includes a panel having a plurality of porous barrier ribs formed in rows, the method having a reflective layer formation step of forming a reflective layer in a rib gap between adjacent barrier ribs, wherein the reflective layer formation step has:

an application substep of applying in the rib gap a reflective layer ink including a powder material used in forming a structural layer of the display panel, water or a water-miscible solvent, a binder formed from a water-soluble resin is included in a range of 1 wt % to 20 wt % inclusive of the ink at a time of application, and a plasticizer, the powder material includes a white pigment having an average particle size in a range of 0.05 $\mu$m to 2 $\mu$m inclusive, and a glass frit material having an average particle size in a range of 0.1 $\mu$m to 3 $\mu$m inclusive; and a baking substep of burning-off the binder and the plasticizer included in the applied reflective layer ink wherein the structural layer is a reflective layer.

25. The manufacturing method of claim 24, wherein a viscosity of the reflective layer ink is in a range of 0.3 Pa.s to 50 Pa.s inclusive.

26. A manufacturing method for a plasma display panel that includes a panel, the method having a shading film formation step of forming a shading film on a principal surface of the panel, wherein the shading film formation step has:

an application substep of applying to the principal surface of the panel a shading film ink including a powder material used in forming a structural layer of the display panel, water or a water-miscible solvent, a binder formed from a water-soluble resin included in a range of 1 wt % to 20 wt % inclusive of the ink at a time of application and a plasticizer wherein the structural layer is a shading film, and the powder material includes a black pigment, and a glass frit material having an average particle size in a range of 0.1 $\mu$m to 1 $\mu$m inclusive; and a baking substep of burning-off the binder and the plasticizer included in the applied shading film ink.

27. A manufacturing method for a plasma display panel that includes a panel, the method having a sealing layer formation step of forming a sealing layer around a perimeter of the panel, wherein the sealing layer formation step has:

an application substep of applying a sealing layer ink to the perimeter of the panel, the sealing layer ink including a powder material used in forming a structural layer of the display panel, water or a water-miscible solvent, a binder formed from a water-soluble resin, the binder is included in a range of 1 wt % to 20 wt % inclusive of the ink at a time of application wherein the structural layer is a sealing layer, and the powder material includes a glass frit material having an average particle size in a range of 0.1 $\mu$m to 3 $\mu$m inclusive, and a plasticizer; and a baking substep of burning-off the binder and the plasticizer included in the applied sealing layer ink.

28. A phosphor ink for a display panel that is applied to a substrate of the display panel using an inkjet method, comprising:

a powder material having phosphor particles used in forming a layer on the display panel;

water or a water-miscible solvent;

a binder formed from a water-soluble cellulose; and a plasticizer is included in a range of 4 wt % to 8 wt % inclusive of the phosphor ink at a time of application wherein a viscosity of the phosphor ink can approach 50 Pa.s.

* * * * *